(12) United States Patent
Knezevic et al.

(10) Patent No.: US 10,443,672 B2
(45) Date of Patent: Oct. 15, 2019

(54) DAMPING VALVE FOR A VIBRATION DAMPER

(71) Applicant: ZF FRIEDRICHSHAFEN AG

(72) Inventors: Aleksandar Knezevic, Eitorf (DE); Jörg Rösseler, Ruppichteroth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/561,279

(22) PCT Filed: Mar. 1, 2016

(86) PCT No.: PCT/EP2016/054264
§ 371 (c)(1),
(2) Date: Sep. 25, 2017

(87) PCT Pub. No.: WO2016/155961
PCT Pub. Date: Oct. 6, 2016

(65) Prior Publication Data
US 2018/0119767 A1    May 3, 2018

(30) Foreign Application Priority Data

Apr. 2, 2015 (DE) ........................ 10 2015 206 022

(51) Int. Cl.
*F16F 9/34* (2006.01)
(52) U.S. Cl.
CPC .................................. *F16F 9/3415* (2013.01)

(58) Field of Classification Search
CPC ........ F16F 9/3415; F16F 9/348; F16F 9/3482; F16F 9/3484; F16F 9/3485; F16F 9/3488
See application file for complete search history.

(56) References Cited

U.S. PATENT DOCUMENTS 3,621,951 A   11/1971  Schmid
4,653,617 A    3/1987  Casimir

FOREIGN PATENT DOCUMENTS

| DE | 1817391 | 7/1970 | |
| DE | 1817392 | 7/1970 | |
| DE | 3503152 | 8/1986 | |
| DE | 102006031179 B3 * | 12/2007 | ............ F16F 9/3485 |
| GB | 2332727 | 12/1997 | |
| JP | 2008274991 | 11/2008 | |
| WO | WO-2017198405 A1 * | 11/2017 | ............ F16F 9/3415 |
| WO | WO-2017215854 A1 * | 12/2017 | ............ F16F 9/3415 |

* cited by examiner

*Primary Examiner* — Melanie Torres Williams
(74) *Attorney, Agent, or Firm* — Cozen O'Connor

(57) ABSTRACT

A damping valve (1) for a vibration damper, includes a damping valve body (3) with at least one through-channel (13; 15) whose outlet side is at least partially covered by at least one valve disk (17; 19), wherein the at least one valve disk (17; 19) lifts from a valve seat surface (21) during impingement via the through-channel (13; 15), and a supporting disk (23), as stop, limits the lifting movement, wherein the supporting disk (23) is outfitted in direction of the valve disk (17; 19) with an elastomeric support (25) which is formed by a plurality of individual supporting elements (25).

8 Claims, 2 Drawing Sheets

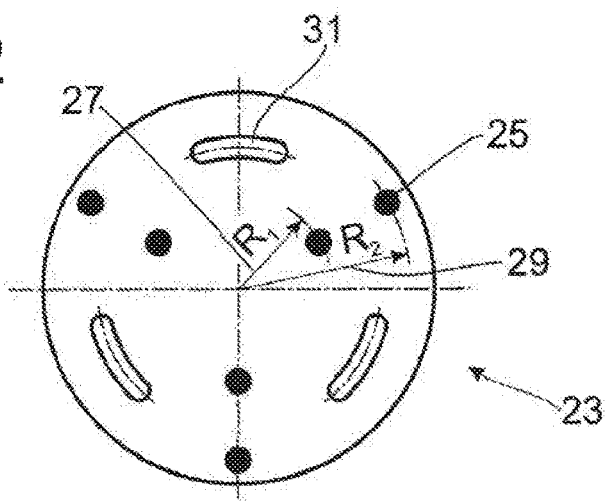
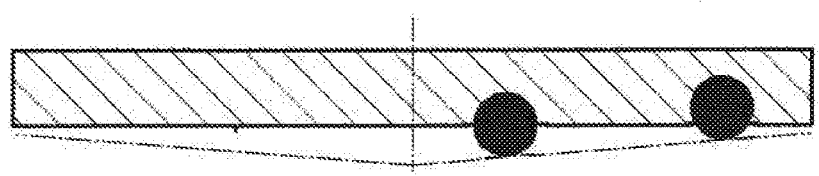
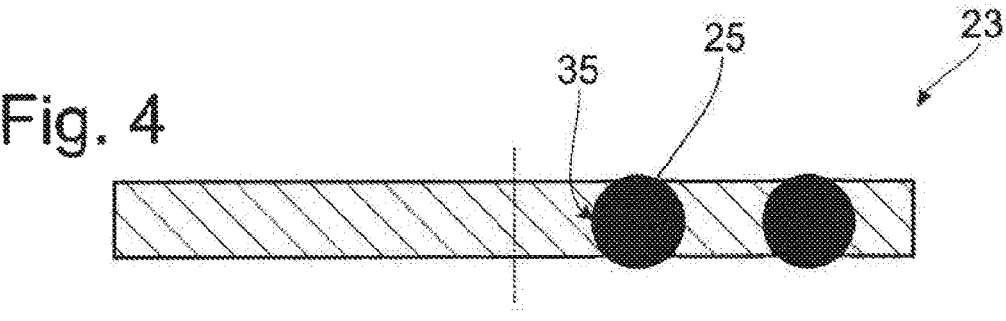
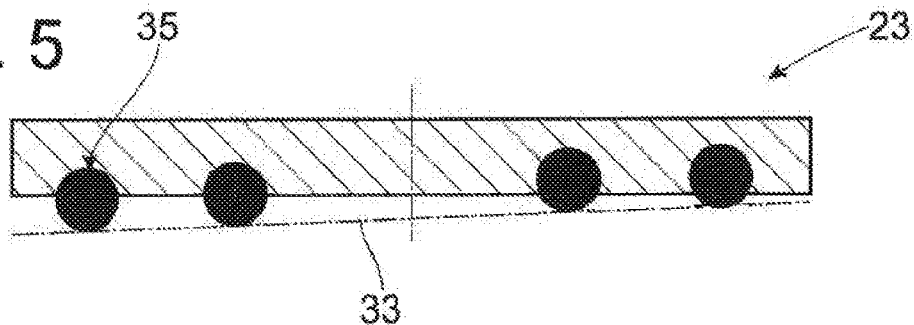

DAMPING VALVE FOR A VIBRATION DAMPER

PRIORITY CLAIM

This is a U.S. national stage of application No. PCT/EP2016/054264, filed on Mar. 1, 2016. Priority is claimed on the following application: Country: Germany, Application No.: 10 2015 206 022.5, filed: Apr. 2, 2015, the content of which is/are incorporated herein by reference in its entirety.

FIELD OF THE INVENTION

The invention is directed to a damping valve having a supporting disk with a elastomeric support.

BACKGROUND OF THE INVENTION

A damping valve for a vibration damper comprises a damping valve body with at least one through-channel whose outlet side is at least partially covered by at least one valve disk. When the valve side is impinged via the through-channel, the valve disk lifts from a valve seat surface. In order to protect the valve disk from a mechanical overload, at least one supporting disk which limits the lifting movement is generally used as stop. In its simplest embodiment, the supporting disk is constructed as a simple, usually metal, annular disk. In contrast, the valve disk is elastically deformable within limits or is supported so as to be axially moveable against a spring. Regardless of the embodiment form, sudden peak loads occurring in damping operation have the effect that the valve disk impacts on the supporting disk. This impact is audible.

One solution can consist in using a plurality of valve disks in layered arrangement. Because of the layering, there is a supporting function within the disk package. A disadvantage may consist in that an increase in the damping force characteristic occurs in valve disks that tend to be rigid.

A damping valve for a vibration damper is known from the generic DE 18 17 392 B2. This damping valve has an elastomeric support constructed as an elastomeric ring which counteracts an impacting movement of the valve disk against a supporting ring. As regards the stop function, the elastomeric ring acts as a sealing ring so that damping medium can only flow radially out of the damping valve.

It is an object of the present invention to develop the generic damping valve with a view to improving the flow-off behavior.

SUMMARY OF THE INVENTION

This object is met in that the elastomeric support is formed by a plurality of individual supporting elements.

At least two flow cross sections are located between the at least two individual supporting elements and are available as flow paths for damping medium out of the damping valve.

The individual supporting elements are preferably constructed as balls. An individual supporting element of this kind has the advantage that it does not require any particular orientation with respect to the valve disk and can be manufactured very easily as a mass-produced article.

The individual supporting elements can be arranged on different pitch circles and accordingly provide a plurality of supporting points for the valve disk in radial direction.

Optionally, the individual supporting elements can have a different axial distance from the valve disk and accordingly influence the lifting movement of the valve disk in some areas.

It can also be provided that the individual supporting elements form a stop plane. A stop plane of this kind effectively supports the valve disk two-dimensionally.

The stop plane can be constructed as an oblique plane with respect to the valve disk, e.g., in order to achieve a specific opening movement of the valve disk.

Alternatively or in combination with this, the individual supporting elements can have different spring rates. This step can also serve to specifically control the lifting movement of the valve disk.

A very simple possibility for influencing the lifting movement consists in that receptacles in the supporting disk for the individual supporting elements have different depths. Standardized individual supporting elements can be used in this case. The supporting disk can have a plurality of receptacles, but not all of the receptacles need be outfitted with an individual supporting element. This is done in individual cases according to the requirements of the damping valve configuration.

According to an advantageous embodiment, the supporting disk can have axially continuous receiving openings, and the individual supporting elements extend through the supporting disk so as to project out on both sides. With a construction of this kind, two different supporting characteristics can be achieved with a single supporting disk and alternate installation position.

BRIEF DESCRIPTION OF THE DRAWINGS

The invention will be described in more detail in the following with reference to the figures in which:

FIG. 2 is a top view of a supporting disk of the damping valve according to FIG. 1;

FIG. 3-5 is a view of different embodiments of a supporting disk of the present invention.

DETAILED DESCRIPTION OF THE PRESENTLY PREFERRED EMBODIMENTS

Figure 1:
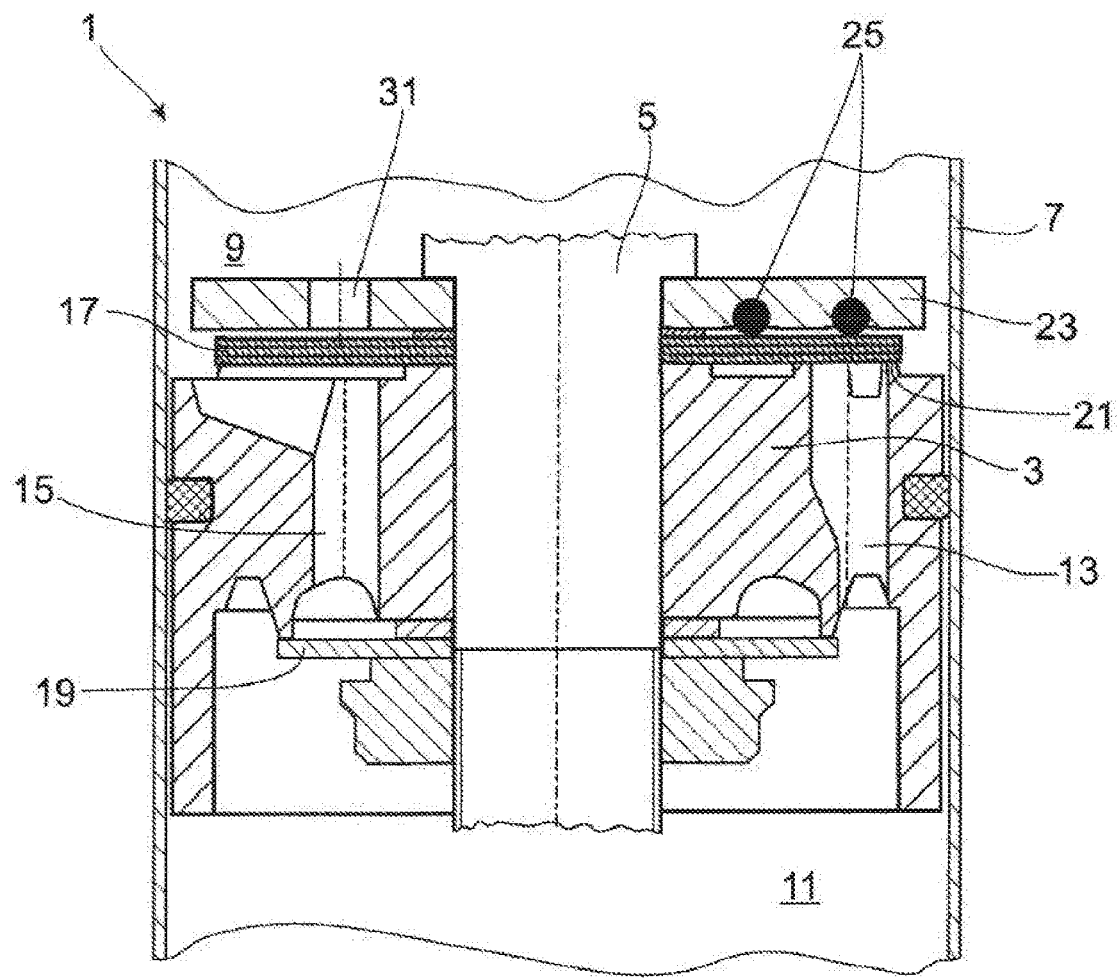
FIG. 1 is a sectional view of a damping valve.

FIG. 1 shows a damping valve 1 for a vibration damper of any constructional type. The damping valve 1 comprises a damping valve body 3 which is fastened to a piston rod 5. The invention is not limited to an embodiment of this type and can be used, e.g., in a bottom valve or also within the framework of an adjustable damping valve.

The damping valve body 3 divides a cylinder 7 of the vibration damper into a working chamber 9 on the piston rod side and a working chamber 11 remote of the piston rod, both of which are filled with damping medium. Through-channels 13; 15 for each throughflow direction are constructed in the damping valve body 3 on different pitch circles. The configuration of the through-channels is to be considered only as an example. An outlet side of through-channels 13; 15 is at least partially covered by at least one valve disk 17; 19.

During an impingement of the valve disk 17 proceeding from the working chamber 11 remote of the piston rod, the valve disk 17 is lifted from its valve seat surface 21. The lifting movement is controlled and braked in a damped manner by a supporting disk 23 combined with an elastomeric support. The elastomeric support is formed by a plurality of individual supporting elements 25.

The individual supporting elements 25 are preferably formed as balls. Barrel-shaped constructions are also advantageous. Both constructional shapes can be fitted simply and so as not to be dependent on position.

As is shown in FIG. 2, the individual supporting elements 25 are arranged in the supporting disk 23 on different pitch circles 27; 29 with radii $R_1$ and $R_2$ and form a stop plane. Of course, other pitch circle diameters can also be used. It is possible to construct the supporting disk 23 with axial openings 31 which form a flow path between an upper side of the valve disk 17 and the adjoining working chamber 9 (see FIG. 1).

When the valve disk 17 is lifted from the valve seat surface 21, the damping medium can not only flow out radially at the valve disk 17 but can also flow between the individual supporting segments 25 and, in doing so, utilize the axial openings 31 as flow-off path.

FIGS. 3 and 4 show by way of example that the individual supporting elements 25 at the supporting disk 23 can have a different axial distance from the valve disk 17 as is shown by the dotted lines. For example, it is shown in FIG. 3 that the lifting path is greater at the outer circumference of the valve disk 17 than in the central area.

In FIG. 5, the individual supporting elements 25 form a stop plane 33 which is formed as an oblique plane, e.g., in order to achieve a defined lifting point of the valve disk 17.

To this end, individual supporting elements 25 can be provided with different diameters or working heights. With standardized individual supporting elements 25, however, it can also be provided that trough-shaped receptacles 35 in the supporting disk 23 have different receiving depths for the individual supporting elements 25 so that the axial projecting length and, consequently, the distance from the valve disk 17 are determined by means of the receiving depth.

Alternatively or in combination, the individual supporting elements 25 can have different spring rates. With a standardized constructional form of the individual supporting elements 25, the spring rate can be achieved, e.g., by a different Shore hardness of the starting material.

FIG. 4 shows a constructional shape of the supporting disk 23 which has axially continuous receiving openings 35, and the individual supporting elements 25 penetrate the supporting disk 23 with a projecting length which is, however, different on both sides. A supporting disk of this kind can then have two installation positions. The damping characteristic of the individual supporting elements 25 will be determined depending on which top side faces in direction of the valve disk 17.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A damping valve (1) for a vibration damper, comprising:
   a damping valve body (3) including at least one through-channel (13; 15) having an outlet side;
   at least one valve disk (17; 19) at least partially covering said outlet side, said at least one valve disk (17; 19) lifting from a valve seat surface (21) during impingement via said at least one through-channel (13; 15);
   a supporting disk (23) acting as a stop by limiting the lifting movement of said valve disk, and wherein said supporting disk (23) comprises in the direction of said valve disk (17; 19) an elastomeric support (25) formed by a plurality of individual supporting elements (25); and
   wherein said supporting disk (23) comprises axially continuous receiving openings (35), and said individual supporting elements (25) extend through said supporting disk (23) so as to project out on both sides.

2. The damping valve according to claim 1, wherein said individual supporting elements (25) are constructed as balls.

3. The damping valve according to claim 1, wherein said individual supporting elements (25) are arranged on different pitch circles (27; 29).

4. The damping valve according to claim 1, wherein said individual supporting elements (25) have a different axial distance from having valve disk (17).

5. The damping valve according to claim 1, wherein having individual supporting elements (25) form a stop plane (33).

6. The damping valve according to claim 5, wherein said stop plane (33) is constructed as an oblique plane with respect to having valve disk (17).

7. The damping valve according to claim 1, wherein said individual supporting elements (25) have different spring rates.

8. The damping valve according to claim 1, additionally comprising receptacles (35) in having supporting disk (23) for having individual supporting elements (25), said receptacles having different depths.

* * * * *